United States Patent [19]
Blahut et al.

[11] Patent Number: 5,570,126
[45] Date of Patent: Oct. 29, 1996

[54] SYSTEM FOR COMPOSING MULTIMEDIA SIGNALS FOR INTERACTIVE TELEVISION SERVICES

[75] Inventors: Donald E. Blahut, Holmdel; Walter Hollenberg, Millburn; Edward S. Szurkowski, Maplewood, all of N.J.

[73] Assignee: Lucent Technologies Inc., Murray Hill, N.J.

[21] Appl. No.: 558,462

[22] Filed: Nov. 16, 1995

Related U.S. Application Data

[63] Continuation of Ser. No. 56,974, May 3, 1993.

[51] Int. Cl.⁶ ...................................................... H04N 7/10
[52] U.S. Cl. .................... 348/7; 348/13; 455/4.2
[58] Field of Search ................................... 348/7, 12, 13, 348/906, 705, 584; 455/4.1, 4.2, 6.2; H04N 7/10

[56] References Cited

U.S. PATENT DOCUMENTS

| | | | |
|---|---|---|---|
| 4,499,568 | 2/1985 | Gremillet | 369/30 |
| 4,763,191 | 8/1988 | Gordon et al. | 358/86 |
| 4,905,094 | 2/1990 | Pocock et al. | 358/342 |
| 5,014,125 | 5/1991 | Pocock et al. | 455/4.2 |
| 5,057,932 | 10/1991 | Lang | 358/335 |
| 5,068,650 | 11/1991 | Fernandez et al. | 348/598 |
| 5,130,792 | 7/1992 | Tindell et al. | 358/85 |
| 5,132,992 | 7/1992 | Yurt et al. | 375/122 |
| 5,133,079 | 7/1992 | Ballantyne et al. | 455/4.1 |
| 5,164,839 | 11/1992 | Lang | 358/335 |
| 5,198,899 | 3/1993 | Cang | 455/4.2 |
| 5,206,929 | 4/1993 | Langford et al. | 348/13 X |
| 5,220,420 | 6/1993 | Hoarty et al. | 358/86 |
| 5,331,417 | 7/1994 | Soohoo | 348/584 |
| 5,365,265 | 11/1994 | Shibata | 348/16 |

FOREIGN PATENT DOCUMENTS 0355697  2/1990  European Pat. Off. .

OTHER PUBLICATIONS

W. D. Sincoskie, "System Architecture for a Large Scale Video on Demand Service," *Computer Networks and ISDN Systems,* 22 (1191) 155–162.

European Search Report dated Aug. 8, 1995 cited in parent application (Blahut 34–1), Appln. No. 94302788.8.

*Primary Examiner*—Victor R. Kostak

[57] ABSTRACT

A system for composing multimedia signals from various source signals, such as still-frame video signals, full motion video signals and audio signals includes a plurality of composing units, each of which is capable of composing a multimedia signal from selected source signals. One of such composing units is assigned for each multimedia signal to be composed. Each composing unit accepts parameters specifying various properties for each element of the multimedia signal, such as size, position and precedence for each video element and gain for each audio element. The composing units can include decompressors for decompressing source signals furnished in compressed form and a compressor to compress the multimedia signal to be transmitted to a user. The source signals can be received from a packet network and the resulting multimedia signals transmitted to the respective users via the same packet network.

18 Claims, 4 Drawing Sheets

SYSTEM FOR COMPOSING MULTIMEDIA SIGNALS FOR INTERACTIVE TELEVISION SERVICES

This application is a continuation of application Ser. No. 08/056974, filed on May 3, 1993.

TECHNICAL FIELD

This invention relates to interactive television (ITV) systems, and more particularly to systems for generating multimedia signals from various video and audio sources for transmission to users in connection with furnishing interactive television services.

BACKGROUND OF THE INVENTION

Cable television systems have made possible the transmission of many channels of television programs to the homes of subscribers. Instead of being limited to the number of VHF and UHF channels that can be transmitted and received in a given area, the number of channels in cable systems is limited only by the transmission characteristics of the cable itself and the ability to compress the information in television programs into narrower-bandwidth channels. The advent of fiber-optic transmission systems for use in cable television networks has also vastly increased the number of channels available.

Such increase in channels has also given rise to proposals for interactive television systems wherein a subscriber can transmit information or requests back into the system, which information or requests may subsequently affect programs or information directed to such subscriber. There are a wide variety of applications for interactive television systems, such as video games, video catalog shopping, teaching systems, movies on demand and audio programs. Each application can be tailored for an individual subscriber, for example, a subscriber may be able to select the language of the soundtrack in a movie. However, such systems typically require the ability (i) to control specific programs or information sent to each subscriber and (ii) to receive input messages or requests from the subscriber.

A headend-to-subscriber channel does not need the full bandwidth of the usual television cable channel if compression can be used. For example, if a television signal is digitized and compressed in accordance with the MPEG standard, it is possible to transmit sixteen television programs digitally over a single conventional 6 Mhz cable channel. Other program information, such as high-fidelity audio, still video pictures or text can also be sent in compressed form. By using a large number of conventional channels for ITV purposes, such as is now possible with optical fiber distribution systems, together with compression, it is conceivable that hundreds of virtual channels could be made available.

Systems are also becoming available for transmitting compressed and encoded television signals over telephone circuits. In one such system, 1.5 megabits/second of data, sufficient for one compressed and encoded television channel, can be transmitted from a telephone central office over a twisted-pair loop to a subscriber's premises, and 16 kilobits of data can be transmitted back to the central office, together with regular telephone service. Such a loop is known as an asymmetric digital subscriber loop.

With the wide deployment of digital communication systems, standardized digital transmission systems have become available in which data is transmitted in packet form over networks. One such network is an asynchronous transmission mode (ATM) network in which packets of varying length can be sent. Such packet networks can be used for carrying digitized television signals.

Clearly the means now exist by which tailored television signals can be delivered to individual users, such as by cable television systems, telephone networks, packet networks and satellites. Also, a large number of sources are available from which programs and interactive television applications can be provided. However, problems arise in the efficient generation of television signals composed of signals from multiple video and/or audio sources for use in providing interactive television services.

SUMMARY OF THE INVENTION

The system of the invention composes multimedia signals from various source signals, such as still-frame video signals, full motion video signals and audio signals. The system includes a plurality of composing units each of which is capable of composing a multimedia signal from selected source signals. One of such composing units is assigned for each multimedia signal to be composed. Each composing unit accepts parameters specifying various properties for each element of the multimedia signal, such as size, position and precedence for each video element and gain for each audio element.

Each composing unit can include decompressors for decompressing source signals furnished in compressed form and a compressor to compress the multimedia signal to be transmitted to the user.

The source signals can be received from a packet network and the resulting multimedia signals transmitted to the respective users via the same packet network.

These and other aspects of the invention will become apparent from the drawings and the detailed description.

DETAILED DESCRIPTION

Figure 1:
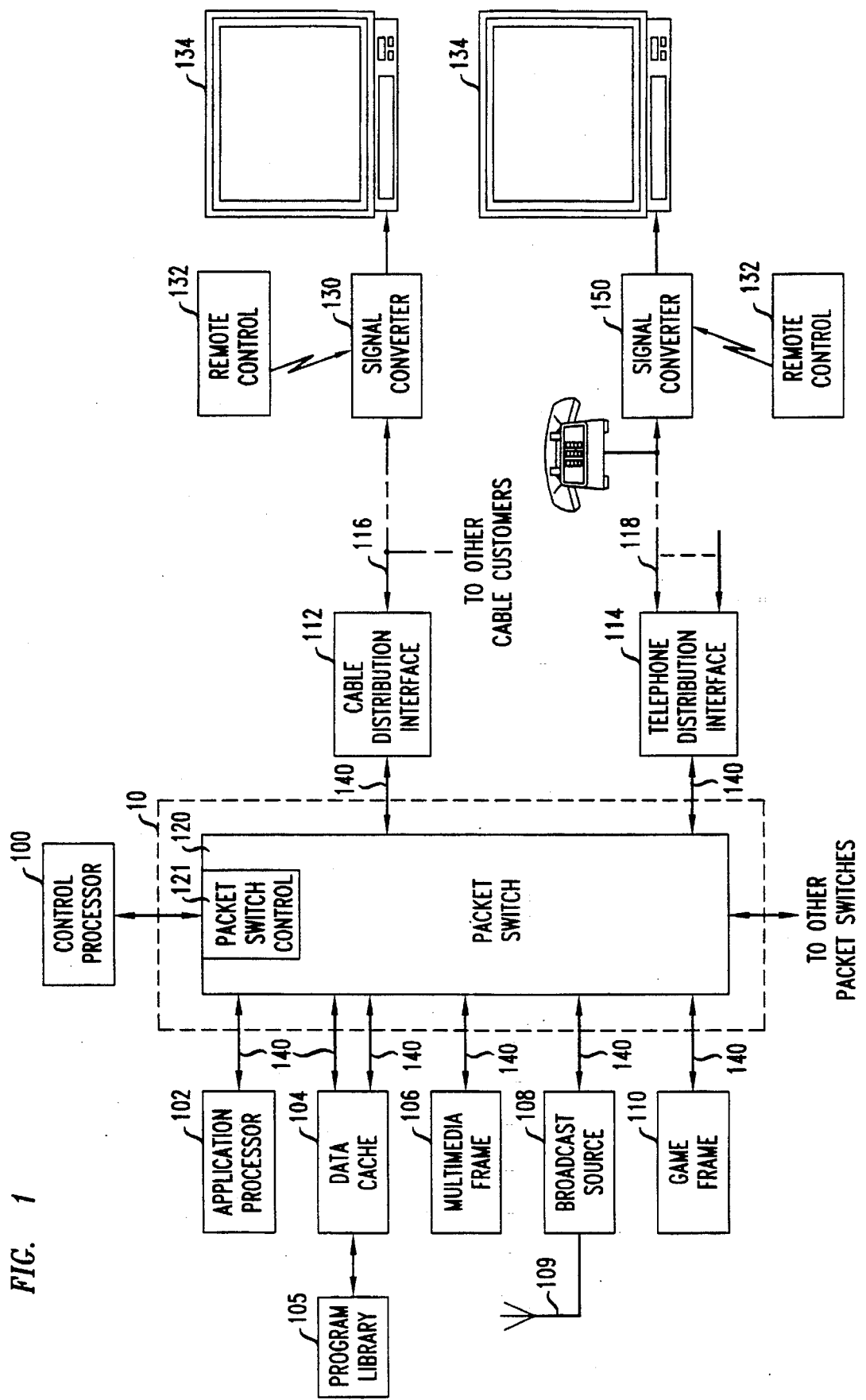
FIG. 1 is an overall block diagram of an integrated television services system using the multimedia frame of the invention.

FIG. 1 is an overall block diagram of a basic integrated television services system in which the multimedia frame of the invention can be used. The elements of the system communicate through packet network 10, which includes one or more packet switches 120. Such elements include control processor 100, application processor 102, application resources such as data cache 104, multimedia frame 106, broadcast source 108 and game frame 110 and one or more distribution interfaces 112 and 114, all of which are connected by links 140 to packet switch 120. Program library 105 is a high-capacity, long-term source of stored program material for data cache 104. Broadcast source 108 furnishes digitized and compressed program material from television broadcasts, cable systems, satellites or other means. In an exemplary embodiment, packet network 10 is an asynchronous transfer mode (ATM) network, links 140 are SONET OC-3 links, and packet switch 120 is an ATM switch such as the AT&T GCNS- 2000 ATM switch.

In general, control processor 100 serves to interact with users selecting any of the various interactive services that may be provided by the system of the invention, and application processor 102 controls the services themselves. Control processor 101 also assigns the resources necessary to provide a service to a user. Application processor 102 and application resources such as data cache 104, multimedia frame 106, broadcast source 108 and game frame 110 can be duplicated as necessary to meet the capacity requirements of the system, but control processor 100 is preferably not duplicated because such processor maintains assignment records for the various resources in the system and making such records available to more than one processor, while achievable, is cumbersome. However, these task assignments to control processor 101 and application processor 102 are not inviolate; for example, in some cases it may be desirable to combine the functions of both processors in a single processor, or to use control processor 100 for certain applications.

Data cache 104 is a large random access memory for storing audio and video material in compressed and packetized form, such as the program server described in our copending patent application Ser. No. 07/997,985 filed Dec. 29, 1992 and having the same assignee as this invention. Data cache 104 can have one or more links 140 into packet network 10 depending on capacity requirements. Program library 105 can be a large-capacity system of any convenient type for storing program material, such as movies, musical selections, video clips, still frames and audio clips, in digitized and compressed form on devices such as magnetic tapes or optical discs and the like. Link 142 between program library 105 and data cache 104 can also be made via a separate ATM packet network, such as a SONET OC-3 network, or via packet network 10, depending on capacity and geographic limitations. Program library 105 is typically equipped to transmit a large quantity of data, such as digitized and compressed video and audio signals for complete movies, to data cache 104 in a relatively short time, as described in more detail in our above mentioned application.

It is contemplated that the various elements shown in FIG. 1 can be situated at different geographic locations. For example, packet switch 120, control processor 100, application processor 102, multimedia frame 106, broadcast source 108 and game frame 110 can be at a first location, data cache 104 can be at a second location and program library 105 can be at a third location. Other packet switches 120 and distribution interfaces such as 112 and 114 can be at still other locations. Connections between locations can be SONET OC-3 links. It will be clear to those skilled in the art that numerous possible combinations of and locations for such elements are possible without departing from the spirit and scope of the invention.

Many interactive television services may be offered that incorporate broadcast television programs. Therefore, one of the application resources provided in the system of the invention can be a source of such programs, such as broadcast source 108, which receives one or more broadcast television signals from regular broadcasts, satellite transmissions, cable television systems or any other appropriate means, all symbolized by antenna 109. Broadcast TV source 108 includes facilities for digitizing and compressing each received television signal and transmitting such signals in packetized form via packet network 10.

Multimedia frame 106 contains a number of units for composing compressed and packetized multimedia signals from a number of different sources, such as data cache 104, broadcast source 108 and internal text generators. Each such source typically provides a signal in digitized and compressed form. When a multimedia signal composed from multiple video and/or audio sources is to be transmitted to a user, control processor 100 assigns one of such composing units and the necessary virtual channels to create the multimedia signal. Note that the input signals to multimedia frame 106, as well as output signals to users, are all transmitted in packetized form through packet network 10. Multimedia frame 106 will be described in more detail below.

Game frame 110 contains a number of units for generating compressed and packetized audio and video signals for use in computer games that may be offered as part of an interactive television service. One such unit is assigned to each user of a computer game.

Application processor 102 and applications resources 104, 106, 108 and 110 can be combined in various ways to form what can be thought of as application servers for providing different ITV services. For example, a video-on-demand/enhanced-pay-per-view server could include application processor 102 and data cache 104; a multimedia ITV server could include application processor 102, data cache 104, multimedia frame 106 and broadcast source 108; and a game server could include application processor 102, multimedia frame 106 and game frame 110. Each application processor 102 can be a part of more than one such server, up to the limit of its capacity.

Interfaces such as cable distribution interface 112 are typically located at cable television system headends and connected to signal converters 130 situated on cable customers' premises by distribution cable 116, whereby the signal converter 130 for each cable customer receives the same overall "downstream" signals broadcast to all cable customers served by the same cable distribution interface 112. However, signal converters 130 can be enabled by control packets transmitted over cable 116 to receive only certain specified "virtual" channels from cable 116.

Interfaces such as telephone distribution interface 114 are typically located at telephone central offices and connected to signal converters 150 situated on telephone subscribers' premises by subscriber loops 118, whereby each telephone subscriber receives a different downstream signal.

Signal converters 130 and 150 convert the downstream signals into conventional television signals for display on television receivers 134. Users can send "upstream" signals to control processor 100 and applications processors 102 from input means such as remote control 132 that transmit control messages to signal converters 130 or 150, as the case may be. Other devices, such as processors, printers, video cameras, telephones and other input and output devices can be connected to signal converters 130 and 150 as required for the provision of ITV services.

The various data and control packets transmitted through the packet network each contain a header and a body. The header defines a "virtual channel" in which the packet is deemed to be transmitted. In data packets, the body contains data, such as part of a digitized and compressed audio or video signal. In control packets, the body contains information such as the address of the unit for which the packet is intended and an action to be performed. In the exemplary embodiment, each packet contains five bytes in the header and 48 bytes in the body. The header can include information such as polling addresses and virtual channel identifies. Control packets are typically sent in one or more specifically assigned virtual channels, for example, channel "0."

For each link 140 connected to packet switch 120, packet switch control 121 stores information specifying how to route packets arriving over such link. Such information is based on header contents; for example, certain virtual channels and/or certain polling addresses can be identified for transmission over a link. A packet arriving at packet switch 120 over any link is then routed to one or more links 140 depending on its header contents. Packet switch control 121 can itself receive packets from packet network 10, and, in the system of the invention, control processor 100 sends control packets as needed to packet switch control 121 containing such identifying information for each link 140.

In the exemplary embodiment, a television signal is made up of three separate data signals, one video and two audio (for stereophonic sound). Each signal is separately digitized and compressed and sent through packet network 120 as a packet stream in a separate virtual channel. Accordingly, three virtual channels are used for transmission of a single television signal. However, other embodiments are possible in which multiple audio channels are encoded and compressed together, such as the Dolby (r) AC-2 system.

Figure 2:
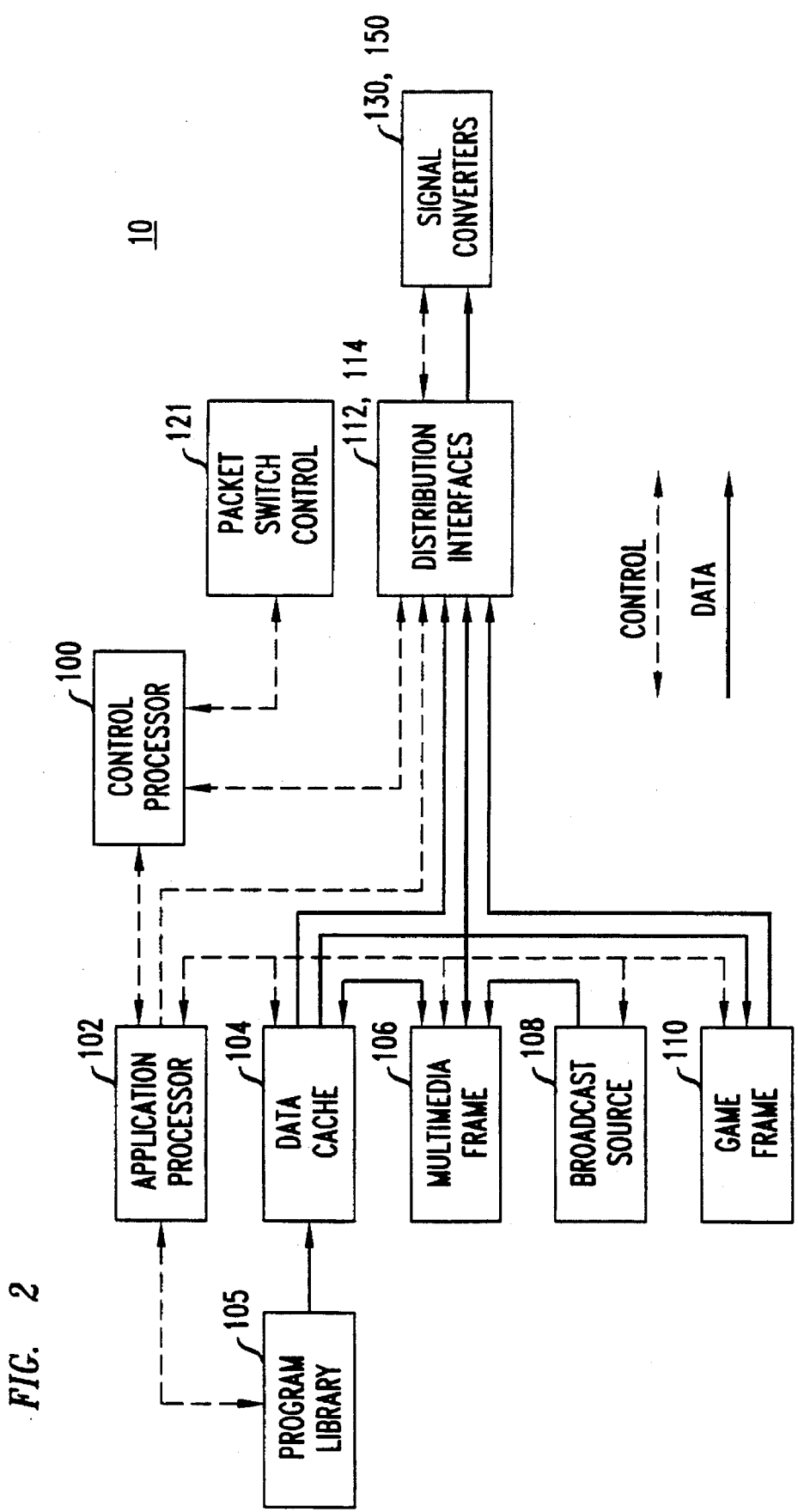
FIG. 2 is a block diagram showing the overall flow of control and data packets in the system of FIG. 1.

FIG. 2 shows typical flows of data and control packets through packet network 10 and in other parts of the system. During the furnishing of ITV services, data packets containing audio and/or video information flow from application resources such as data cache 104, multimedia frame 106 and game frame 110 to signal converters 130 and 150. Such data packets can also flow between application resources, such as from data cache 104 to multimedia frame 106 and game frame 110 and from broadcast source 108 to multimedia frame 106. During interactions with users, control packets flow between signal converters 130 and 150 and control processor 100 and/or between signal converters 130 and 150 and application processor 102. Control processor 100 interacts with application processor 102 and with packet switch control 121 by means of control packets, and application processor 102 interacts with application resources 104, 105, 106, 108 and 110 by means of control packets. Data packets from program library 105 to data cache 104 can be sent via a direct link or via a packet network; even via packet network 10, if convenient. The link between application processor 102 and program library 105 carries only control packets and can be of lower capacity than the links 140, for example, such link can be part of an Ethernet (r) network. However, such link can also be a low-bandwidth virtual channel in packet network 10, if desired.

The flexibility of packet network 10 makes possible flows of data and control packets between any pair of terminals and from one terminal to groups of terminals. Possibly useful paths for control packets that are not shown are between signal converters 130 and 150 on the one hand to multimedia frame 106 and game frame 110 on the other. These paths may be desirable for use in time-dependent interactive applications using multimedia frame 106 and game frame 110 in which an extremely fast response to an action by a user is desired. As will be described, multimedia frame 106 contains processors that can generate and respond to such control packets, and game frame 110 typically will also contain such processors.

In general, control processor 100 interacts with users to control requested services and to assign the various resources needed to furnish the services, including the necessary virtual channels in packet network 10 and the various other links in the system. During the delivery of a service by application resources 104, 106 and 110, under control of application processor 102, control processor 100 maintains supervision by responding to certain control packets from signal converters 130 and 150; application processor 102 responds to control packets from signal converters 130 and 150 specifically relating to an ITV service being delivered. However, as described above, application resources may be equipped to respond directly to control packets from signal converters 130 and 150.

Figure 3:
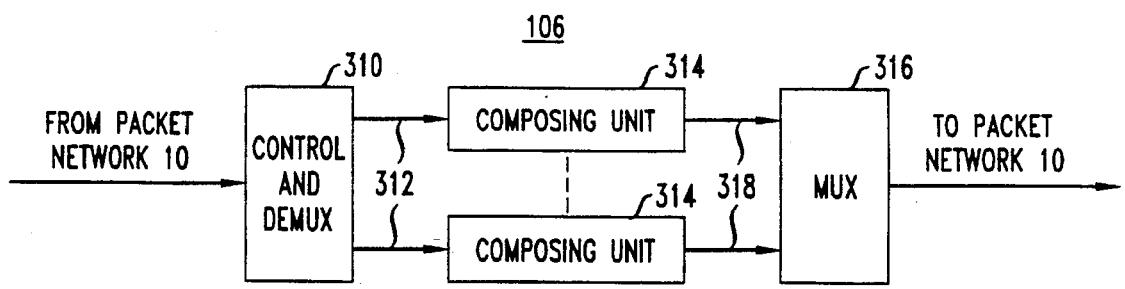
FIG. 3 is an overall block diagram of the multimedia frame of the invention.

FIG. 3 is an overall block diagram of multimedia frame 106, which includes a control and demultiplexer (DEMUX) unit 310, a number of composing units 314 and a multiplexer unit 316. Control and demultiplexer 310 routes packets from packet network 10 for the various components to be included in multimedia signals via links 312 to the various composing units 314. Multiplexer 316 accepts packets for the various multimedia signals via links 318 from composing units 314 and transmits such packets over packet network 10.

Figure 4:
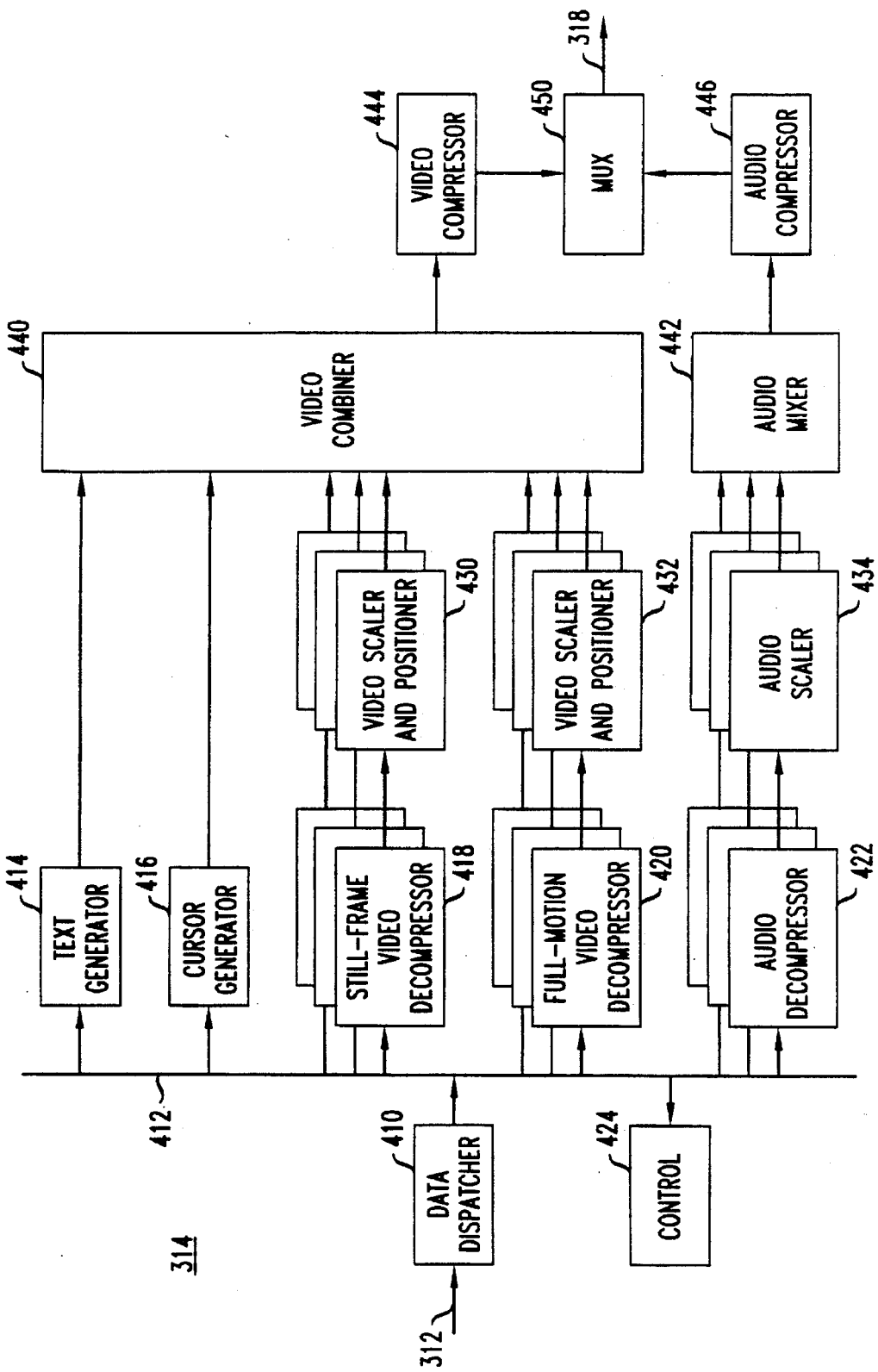
FIG. 4 is a block diagram of a composing unit used in the multimedia frame of the invention.

FIG. 4 is an overall block diagram of composing unit 314. Data dispatcher 410 receives packets from control and demultiplexer 310 via link 312 and routes such packets via bus 412 to various elements such as text generator 414, cursor generator 416, still-frame video decompressors 418, full-motion video decompressors 420, audio decompressors 422 and control 424. In general, text generator 414, cursor generator 416 and control 424 receive control packets and still-frame video decompressors 418, full-motion video decompressors 420 and audio decompressors 422 receive data packets.

The output of each video decompressor 418 and 420 is connected to the input of a corresponding video scaler and positioner 430 and respectively, the outputs of which are connected to video combiner 440. The output of each audio decompressor 422 is connected to the input of a corresponding audio scaler 434, the outputs of which are connected to audio mixer 442. Video combiner 440 composes full-motion video frames in digital form from the various outputs from scalers and positioners 430 and 432 and video compressor 444 compresses such frames into data packets for transmission via multiplexer 450, link 318 and multiplexer 316 (FIG. 3) to packet network 10. Audio mixer 442 combines audio signals from audio scalers 434 and audio compressor 446 compresses such frames into data packets for transmission, again via multiplexer 450, link 318 and multiplexer 316 to packet network 10. Multiplexers 450 and 316 can be combined, if convenient.

Text generator 414 generates text for display on a user's television screen in response to control packets received from data dispatcher 410. Text generator 414 can include facilities for producing different type styles and other displays such as icons and graphic symbols, and can be arranged to place text and other display material at any location on the screen, as is well known in the art. Control packets for text generator 414 typically originate in control processor 100 or application processor 102; however, for complex text messages that are used often, it may be desirable to store such packets in data cache 104.

Cursor generator 416 generates a cursor for display on a user's television screen when required by a particular ITV service. The cursor symbol to be used and its position on the screen are specified by control packets received via data dispatcher 410. The position of a cursor is typically determined by interaction with a user operating an input device such as a mouse, a trackball or the like connected to signal converter 130 or 150. The cursor position can be associated with locations of letters or symbols in text, or with the position of other elements on the screen, as desired. As mentioned above, control packets from a user during an application are typically routed to application processor 102. However, because of the highly time- dependent nature of cursor movement, this is an example of a situation in which it may be desirable for control packets from a user to bypass application processor 102 and be routed directly from packet network 10 to multimedia frame 106. Such packets then proceed through control and demultiplexer 310 to data dispatcher 410 and cursor generator 416 in the composing unit 314 assigned to the user.

An alternative location for text generator 414 and/or cursor generator 416 is in signal converter 130 or 150 at the user's location. In such a configuration, control packets specifying text can be transmitted to the signal converter and control packets specifying cursor position can be transmitted by the signal converter. The choice is a tradeoff based on the cost of providing such units for each user in comparison to the cost of fewer, shared units in composing unit 314 and on differences in control-packet transmissions required.

Still-frame video decompressors 418 receive data packets containing compressed still-frame video information in a format such as the well-known JPEG-standard format. Each decompressor 418 typically includes decompression logic and a frame buffer capable of storing the resulting uncompressed data for all pixels in a full video frame, for example, the C-Cubed CL550 circuit. If desired, such decompressors can also be provided with smaller frame buffers for partial frames. The origin of such data packets will typically be data cache 104.

Similarly, full-motion video decompressors 420 receive data packets containing compressed full-motion video information in a format such as the well-known MPEG-standard format. Each decompressor 420 typically includes decompression logic and one or more frame buffers each capable of storing the uncompressed data for all pixels in a full video frame, for example the C-Cubed CL450 circuit. Again, if desired, such decompressors can also be provided with smaller frame buffers for partial frames. The origin of such data packets will typically be data cache 104 or broadcast source 108.

Audio decompressors 434 receive data packets containing compressed audio information in a format such as the Dolby AC-2 format. The output of audio decompressor 422 is typically one or more audio signals in digital form. If the particular audio compression format used does not provide for multiple channels, then a decompressor 422 can be used for each audio channel desired. Again, the origin of such data packets will typically be data cache 104 or broadcast source 108.

Video scalers and positioners 430 and 432 each have the ability to accept full video frames in digitized form from decompressors 418 and 420, respectively, reduce the scale of such frames and reposition reduced frames at specified locations in a full-size frame. The amount of the scale reduction and the position are specified by control packets received by control 424, which forwards the necessary control information to scalers and positioners 430 and 432 over connections not shown. Thus, the output of each scaler and positioner 430 and 432 is a digitized full video frame or sequence of frames, as the case may be, with the scaled video information at the specified position and the remainder of the frame or frames being black. A specific device that can be used is the Raytheon TMC 2302 circuit.

Audio scalers 434 control the gain of the audio signals from decompressors 422 by means of signals from control 424 in response to control packets. Scalers 434 are provided to correspond with the number of audio channels from decompressors 422, and can be digital or analog, depending on the output from decompressors 422. If multiple audio channels are provided, the apparent position of an audio source can be shifted by appropriate changes in the gain for each channel.

Those skilled in the art will realize that there are many ways in which elements shown in FIG. 4 can be combined. For example, a video decompressor 418 or 420 and its corresponding scaler and positioner 430 or 432 could be combined. Similarly, an audio decompressor 422 might be combined with its corresponding scaler 434. Also, because of the duplication of similar units, the opportunity exists to share various functions among like elements, to the extent that capacity and timing requirements permit.

Video combiner 440 combines the outputs from video scalers and positioners 430 and 432 (and, if provided, text generator 414 and cursor generator 416) into a single video frame. One device that can be used for such purpose is described in application Ser. No. 08/029205 filed on Mar. 10, 1993, in which each input is considered, on a pixel by pixel basis, as a layer with a given precedence and layers with higher precedence mask those with lower precedence. Video composer 440 can also include facilities to produce special effects such as zooms, fades, wipes and other effects well known in the art.

Audio mixer 442 combines the outputs from audio scalers 434 to form the desired number of audio signals, for example, two audio signals if two-channel stereophonic audio is desired. Again, mixer 442 can be analog or digital, depending on the outputs from scalers 434.

Video compressor 444 and audio compressor 446 receive the output signals from video combiner 440 and audio mixer 442, respectively, and compress such signals into the desired format for transmission as data packets over packet network 10. Compressors 444 and 446 can insert the appropriate header information into such packets based on information received from control 424 over connections not shown. The compression formats used by compressors 444 and 446 do not necessarily have to be the same as those used on the input side; in fact, compressors 444 and 446 can be configured to have selectable formats so that a format desired or needed by the user can be used. Again, such format selection can be governed from control 424 in response to received control packets.

Control 424 is typically a microprocessor, such as the AMD 29030 microprocessor, with the necessary stored program and random-access memory needed to respond to control packets and to send the necessary control signals to the various elements in composing unit 314. Control 424 can also be arranged to transmit control packets over packet network 10, such as by a connection (not shown) to multiplexer 450.

In an exemplary embodiment, composing unit 314 includes 2 still-frame video decompressors 418 full-motion video decompressors 420, 5 two-channel audio decompressors 422 and a corresponding number of video scalers and positions 430 and 432 and audio scalers 434. Video combiner 440 has the capacity to handle layers, not including the inputs from text generator 414 and cursor generator 416.

Composing unit 3 14 has been described assuming that the input data packets contain compressed video and audio information. From a practical standpoint, compression is likely to be used because of the significant bandwidth and memory reductions possible. However, it should be clear to those skilled in the art that the principles of the invention can be applied to systems in which such compression, and corresponding decompression, are not used, or are used only in portions of the system.

Composing units similar to 314 but including different complements of resources can be used where appropriate. For example, for applications in which only an additional audio signal need be superimposed on an existing audio signal, or text on a video signal, composing units can be configured especially for such purposes. Composing unit 314 can be thought of as a universal unit capable of meeting many different needs.

Figure 5:
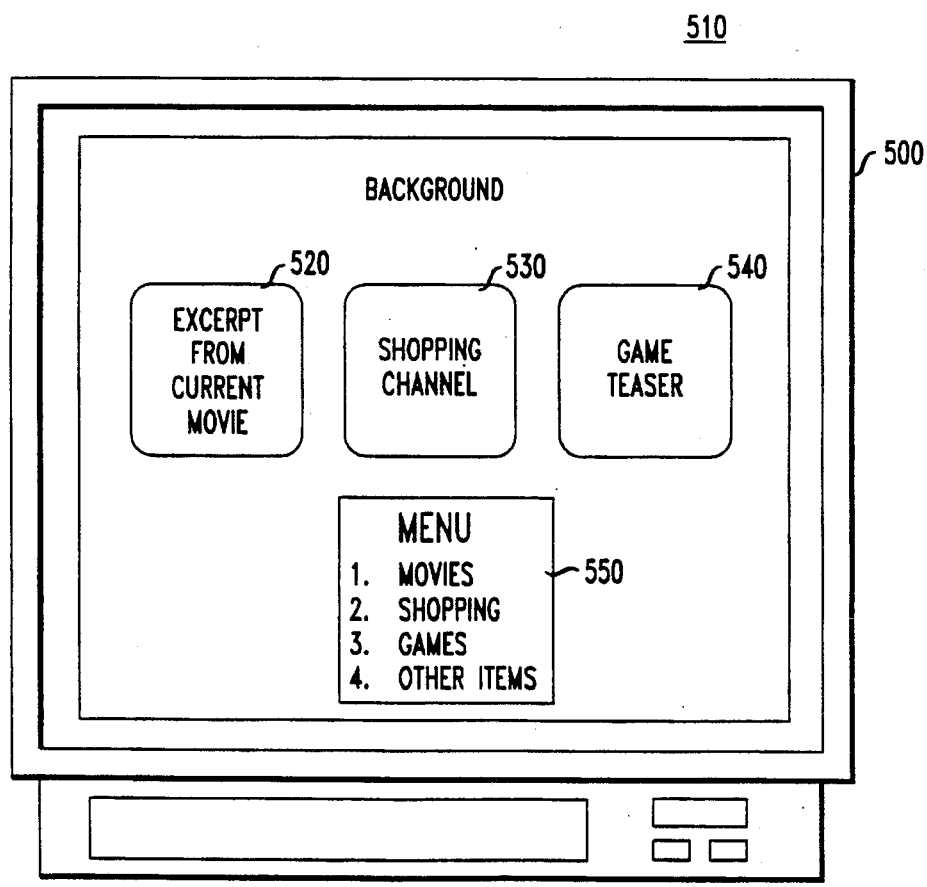
FIG. 5 is a diagram of a multimedia menu screen that can be composed with the system of the invention.

Use of the invention in composing a multimedia menu screen for an interactive television system will now be described. Such a menu screen can be displayed to a user first gaining access to the system on the user's television set, and is an example of a multimedia program composed by a composing unit 312. Referring to FIG. 5, menu screen 500 consists of three scaled-down full-motion video images 520, 530 and 540 displayed in window overlays on a still-frame background 510 and with superimposed text 550. Display of such a screen is typically accompanied by appropriate background audio, such as a stereophonic musical selection, and may also include an introductory voice message, such as a greeting with brief instructions on how to proceed with selection of a service.

Menu screen 500, can be transmitted to signal converters 130 and 150 for users not currently using ITV services (inactive users). Control processor 100 receives control packets from such signal converters. A generic menu screen is somewhat analogous to dial tone in a telephone system, and can be "broadcast" to multiple users by transmitting the audio and video portions of the screen over dedicated virtual channels in packet network 10 and enabling inactive users to receive such dedicated virtual channels when they turn on their television receivers and select the ITV channel. However, when the menu screen is accompanied by an introductory voice message that is cued to begin when the user selects the ITV channel, for example, by means of a control packet sent by signal converter 130 or 150, such voice message can be superimposed on the generic menu screen by means of another composing unit configured for that purpose.

To generate menu screen 500, control processor 100 assigns a composing unit 314 in multimedia frame 106 and virtual channels in packet network 10 for routing the appropriate audio and video signals for the elements in the menu screen, in digitized and compressed form, to the assigned composing unit 314. The full-motion video packets for the movie excerpt to be shown in window 520, the game teaser to be shown in window 540 and the audio packets for the background music and introductory voice message are stored in data cache 104. The video signal for the shopping channel to be shown in window 530 is supplied by broadcast source 108. The video packets for background 510 are transmitted initially to one of still-frame video decompressors 418 and stored in a frame buffer in such decompressor. The text is generated by text generator 414 in composing unit 314. Virtual channels are also assigned for the output of composing unit 314.

Control processor 100 also assigns the elements inside the assigned composing unit 314 needed for the menu screen and initializes the various scalers and positioners in such composing unit by transmitting control packets addressed to such composing unit. Control 424 in the composing unit then transmits the appropriate control signals to the assigned elements. For example, for menu screen 500, one still-frame video decompressor 418 and its associated scaler and positioner are needed for background 500, with the scaler and positioner set to fill the screen with the output frame from such decompressor; three full-motion video decompressors and their associated scalers and positioners are needed for windows 720, 730 and 740, with the scalers and positioners set to reduce the size of and position the windows as shown in FIG. 5; text generator 414 is needed for the text and two audio decompressors 422 and their associated scalers are needed for the introductory voice message superimposed on the musical background. The input to video composer 440 for background 510 is given the lowest precedence; the precedences for windows 520, 530 and 540 and for text 550 can be set arbitrarily as between themselves because there is no overlap of these elements.

The invention has been shown and described with reference to particular embodiments. However, it will be understood by those skilled in the art that various changes may be made therein without departing from the spirit and scope of the invention.

What is claimed is:

1. An interactive multiuser system for composing at least two multimedia signals from a set of source signals, the system comprising:

a plurality of composing unit means for communicating with a plurality of users, each of said plurality of composing unit means composing a plurality of user requested multimedia signals from said set of source signals in response to a user request from any one of the plurality users, each of said sets of source signals comprising a visual signal, an audio signal, and a third set of signals, the third set of signals representing at least one additional video or audio signal;

means for assigning:
  (i) a first composing unit means of the plurality of composing unit means in response to a first user requested multimedia signal of the plurality of user requested multimedia signals from a first user of the plurality of users, and
  (ii) a second composing unit means of the plurality of composing unit means in response to a second user requested multimedia signal of the plurality of user requested multimedia signals from a second user of the plurality of users,;

means for configuring:
  (i) the first composing unit means to compose said first user requested multimedia signal, and
  (ii) the second composing unit means to compose said second user requested multimedia signal;

means for applying:
  (i) a first source signal of the set of source signals to said first composing unit means in response to said first user requested multimedia signal, and
  (ii) a second source signal of the set of source signals to said second composing unit means in response to said second user requested multimedia signal; and means for transmitting said first and second user requested multimedia signals to the first user and the second user, respectively.

2. The system of claim 1, wherein each of said sets of source signals include video signals and each of said plurality of composing unit means comprises at least one means for modifying a video signal in accordance with at least one video parameter, said means for configuring comprising means for applying said at least one video parameter to the at least one means for modifying a video signal, each of said plurality of composing unit means further comprising means for combining outputs of said at least one means for modifying a video signal into a composite video signal representing an overall image.

3. The system of claim 2, wherein said at least one video parameter affects the size in said overall image of an image resulting from said video signal.

4. The system of claim 2, wherein said at least one video parameter affects the position in said overall image of an image resulting from said video signal.

5. The system of claim 2, wherein at least one of said video signals is a still frame video signal.

6. The system of claim 2, wherein at least one of said video signals is a full-motion video signal.

7. The system of claim 1, wherein said set of source signals include audio signals and each of said plurality of composing unit means comprises:

at least one audio modifying means for modifying the audio signals in accordance with at least one audio parameter, said means for configuring comprising means for applying said at least one audio parameter to the at least one audio modifying means, said composing unit means further comprising means for combining outputs of said audio modifying means into a composite audio signal.

8. The system of claim 1, wherein said set of source signals include video signals and each of said plurality of composing unit means comprises:

at least one video modifying means for modifying the video signals in accordance with at least one video parameter, said means for configuring comprising means for applying said at least one video parameter to the at least one video modifying means, each of said plurality of composing unit means further comprising means for combining outputs of said video modifying means into a composite video signal.

9. The system of claim 1, wherein said set of source signals is compressed and each of said plurality of composing unit means further comprises:

at least one means for decompressing at least one of the first and second source signals.

10. The system of claim 1, wherein said at least two multimedia signals are compressed by the plurality of composing unit means and each of the plurality of composing unit means, further comprises:

means for compressing one of the at least two multimedia signals.

11. An interactive multiuser system for composing and transmitting a first video signal and a second video signal, the system comprising:

(a) means for receiving a first request from a first user for the first video signal and a second request from a second user for the second video signal;

(b) a plurality of assignable means for composing, one of the plurality of assignable means composing the first video signal and another one of the plurality of assignable means composing the second video signal in response to the first and second requests, respectively;

(c) means for determining a first assignable means as the one of the plurality of assignable means and a second assignable means as the another one of the plurality of assignable means;

(d) means for independently configuring the first and second assignable means;

(e) means for receiving a first video signal set of at least two video signals at the first assignable means and a second video signal set of at least two video signals at the second assignable means;

(f) means for combining the first video signal set in the first assignable means into the first video signal and the second video signal set assignable means into the second video signal; and (g) means for transmitting the first video signal to the first user and the second video signal to the second user.

12. The apparatus of claim 11, wherein the first and second video signal sets are in a compressed format and the first and second video signals are in the compressed format.

13. The apparatus of claim 11, wherein at least one video signal in the first and second video signal sets is a still frame video signal.

14. The apparatus of claim 11, wherein each of the assignable means for composing, further comprises;

means for modifying a signal in accordance with a video parameter.

15. A method for composing and transmitting a first video signal to a first user and a second video signal to a second user of an interactive multiuser system, the method comprising:

(a) receiving a first request for the first video signal from the first user and a second request for the second video signal from the second user;

(b) assigning a first assignable means from a plurality of assignable means for composing and a second assignable means from the plurality of assignable means for composing, the first assignable means composing the first video signal and the second assignable means for composing the second video signal in response to the first and second requests from the first and second users, respectively;

(c) independently configuring the first and second assignable means;

(d) receiving a first video signal set of at least two video signals and a second video signal set of at least two video signals;

(e) combining the first video signal set in the first assignable means into the first video signal and the second video signal set in the second assignable means into the second video signal; and (f) transmitting with a transmitting means the first video signal to the first user and the second video signal to the second user.

16. The method of claim 15, wherein the first and second video signal sets are in a compressed format and the first and second video signals are in the compressed format.

17. The method of claim 15 wherein at least one video signal in the first and second video signal sets is a still frame video signal.

18. The method of claim 15, wherein each of the plurality of assignable means for composing, further comprises:

means for modifying a signal in accordance with a video parameter.

* * * * *